United States Patent
Kundu

(10) Patent No.: US 11,161,952 B2
(45) Date of Patent: Nov. 2, 2021

(54) METHODS OF INSULATING PIPING AND OTHER MATERIALS USING HIGH TEMPERATURE NON-CROSSLINKED POLYETHYLENE-BASED FOAM

(71) Applicant: Hickory Springs Manufacturing Company, Hickory, NC (US)

(72) Inventor: Debabrata Kundu, Charlotte, NC (US)

(73) Assignee: Hickory Springs Manufacturing Company, Hickory, NC (US)

(*) Notice: Subject to any disclaimer, the term of this patent is extended or adjusted under 35 U.S.C. 154(b) by 95 days.

(21) Appl. No.: 16/286,229

(22) Filed: Feb. 26, 2019

(65) Prior Publication Data

US 2019/0203007 A1 Jul. 4, 2019

Related U.S. Application Data

(63) Continuation of application No. 15/123,554, filed as application No. PCT/US2015/019705 on Mar. 10, 2015, now abandoned.

(60) Provisional application No. 61/950,490, filed on Mar. 10, 2014.

(51) Int. Cl.
| | | |
|---|---|---|
| *C08J 9/00* | (2006.01) | |
| *C08J 9/14* | (2006.01) | |
| *B29C 44/50* | (2006.01) | |
| *B29C 44/56* | (2006.01) | |
| *C08J 3/28* | (2006.01) | |
| *B29K 23/00* | (2006.01) | |

(52) U.S. Cl.
CPC .............. *C08J 9/00* (2013.01); *B29C 44/50* (2013.01); *B29C 44/56* (2013.01); *C08J 3/28* (2013.01); *C08J 9/141* (2013.01); *B29K 2023/06* (2013.01); *B29K 2023/0625* (2013.01); *B29K 2995/0063* (2013.01); *C08J 2201/03* (2013.01); *C08J 2203/14* (2013.01); *C08J 2323/06* (2013.01); *C08J 2323/08* (2013.01)

(58) Field of Classification Search
CPC .. B29C 44/50; B29C 44/56; C08J 3/28; C08J 9/00; C08J 9/141; C08J 2201/03; C08J 2203/14; C08J 2323/06; C08J 2323/08; B29K 2023/06; B29K 2023/0625; B29K 2995/0063

See application file for complete search history.

(56) References Cited

U.S. PATENT DOCUMENTS

| | | |
|---|---|---|
| 4,510,031 A | 4/1985 | Matsumura et al. |
| 4,525,257 A | 6/1985 | Kurtz et al. |
| 4,569,950 A | 2/1986 | Hoshi et al. |
| 4,581,383 A | 4/1986 | Park |
| 4,714,716 A | 12/1987 | Park et al. |
| 4,957,790 A | 9/1990 | Warren et al. |
| 4,968,723 A | 11/1990 | Ando et al. |
| 5,508,319 A | 4/1996 | DeNicola, Jr. et al. |
| 5,552,104 A | 9/1996 | DeNicola, Jr. et al. |
| 5,589,519 A | 12/1996 | Knaus |
| 5,736,618 A | 4/1998 | Poloso et al. |
| 6,541,105 B1 | 4/2003 | Park et al. |
| 6,583,188 B2 | 6/2003 | Chaudhary et al. |
| 6,593,386 B1 | 7/2003 | Malwitz et al. |
| 6,716,914 B2 | 4/2004 | Malwitz et al. |
| 7,094,472 B2 | 8/2006 | Cheng et al. |
| 7,173,069 B2 | 2/2007 | Swennen et al. |
| 8,648,122 B2 | 2/2014 | Vadhar et al. |
| 2003/0051764 A1 | 3/2003 | Jungers et al. |
| 2003/0215589 A1 | 11/2003 | Merical et al. |
| 2005/0106378 A1 | 5/2005 | Rives et al. |
| 2006/0246272 A1 | 11/2006 | Zhang et al. |
| 2008/0047627 A1 | 2/2008 | Jungers et al. |
| 2010/0196641 A1 | 8/2010 | De Vos et al. |
| 2011/0104414 A1 | 5/2011 | Onodera et al. |
| 2013/0267636 A1 | 10/2013 | Satpathy et al. |
| 2017/0073487 A1 | 3/2017 | Kundu |

FOREIGN PATENT DOCUMENTS

| | | | |
|---|---|---|---|
| GB | 2019412 A1 | 10/1979 | |
| JP | 2002275297 A | 9/2002 | |
| JP | 2007118576 A | 5/2007 | |
| KR | 1019990039402 A | 6/1999 | |
| WO | WO-0242679 A1 * | 5/2002 | ........... B29C 44/507 |

OTHER PUBLICATIONS

Extended European Search Report dated Sep. 27, 2017 in European Patent Application No. 15761735.8, 9 pages.
International Search Report and Written Opinion, issued by the International Searching Authority for PCT/US15/19705 dated May 29, 2015, 8 pages.
Examination Report dated Dec. 2019 in EP App. 15761735.8.

* cited by examiner

*Primary Examiner* — Irina S Zemel
(74) *Attorney, Agent, or Firm* — Perkins Coie LLP

(57) ABSTRACT

A linear low density polyethylene (LLDPE) foam and methods of making the same are described. The LLDPE foam has a maximum operating temperature of about 220° F. The LLDPE foam can also have a density in the range of from 0.6 to 10.0 lbs/ft³. The LLDPE foam can be manufactured in part by processing an LLDPE resin in order to create a long branch molecular structure in the LLDPE resin without crosslinking or otherwise adversely affecting the thermoplastic properties of the LLDPE resin.

7 Claims, 2 Drawing Sheets

US 11,161,952 B2

METHODS OF INSULATING PIPING AND OTHER MATERIALS USING HIGH TEMPERATURE NON-CROSSLINKED POLYETHYLENE-BASED FOAM

BACKGROUND

Polymer-based foams can have a variety of different applications. In one particular application, certain polymer-based foams are used as insulation. However, the specific application in which polymer-based foam can be used as insulation is generally limited by the maximum operating temperature of the foam material. For example, non-crosslinked low density polyethylene (LDPE) foam insulation is only rated for use at operating temperatures of about 200° F. and therefore cannot be used as insulation in applications where the maximum operating temperatures are above 200° F.

One specific application where conventional non-crosslinked LDPE foam typically cannot be used due its lower maximum operating temperature is in HVAC systems. In some HVAC systems, the operating temperatures rise to in the range of 220° F. As a result, the HVAC industry has generally had to rely on materials other than non-crosslinked LDPE foam insulation. One such material which the HVAC industry has used in place of non-crosslinked LDPE foam is elastomeric PVC-nitrile foam insulation, which has a maximum operating temperature of 220° F. One main disadvantage with elastomeric PVC-nitrile foam insulation is that the cost of this material is roughly 3 to 5 times that of non-crosslinked LDPE foam insulation.

Because polyethylene-based foam insulation has the potential to be drastically less expensive than, for example, elastomeric PVC-nitrile foam insulation, it would be desirable to identify another polyethylene material that can both be foamed and also provide an insulation material having a maximum operating temperature of 220° F. or higher. However, to date, efforts to achieve both of these objectives have not been successful. For example, it is known that high density polyethylene (HDPE) and linear low density polyethylene (LLDPE) resins have higher melt temperatures than LDPE resins, but efforts to produce foams from these polyethylene resin materials have generally failed due to HDPE and LLDPE resins lacking the long branched molecular structure and the melt strength that is generally required to form a foam material having the desired maximum operating temperature.

SUMMARY

This Summary is provided to introduce a selection of concepts in simplified form that are further described below in the Detailed Description. This Summary, and the foregoing background, is not intended to identify key aspects or essential aspects of the claimed subject matter. Moreover, this Summary is not intended for use as an aid in determining the scope of the claimed subject matter.

The present application relates to LLPDE-based foams having a maximum operating temperature of about 220° F., and methods of manufacturing foam insulation from LLDPE resins.

In some embodiments described herein, the LLDPE-based foam has a maximum operating temperature of about 220° F. and a density in the range of from 0.6 to 10.0 lbs/ft³. In some embodiments, the LLDPE foam meets the ASTM C411 standard for hot-surface performance of high-temperature thermal insulation when tested at 220° F.-and/or achieves a rating of 25/50 when tested by the ASTM E 84 standard for surface burning characteristics of building materials.

In some embodiments described herein, methods of manufacturing LLDPE-based foams generally include a step wherein a LLDPE resin material is processed to create a long branch molecular structure in the LLDPE resin and increase the melt strength of the LLDPE resin. By creating a long branch molecular structure and increasing the melt strength of the LLDPE resin, the LLDPE resin becomes foamable and can be manufactured into foam insulation having a maximum operating temperature that exceeds that of, for example, low density polyethylene foam.

In addition to providing a polyethylene-based foam that has a maximum operating temperature of about 220° F., the LLDPE foam described herein is softer and more stretchable than low density polyethylene foam insulation and is 30 to 50% less expensive than elastomeric PVC-nitrile foam insulation. The LLDPE foam is also recyclable, whereas elastomeric PVC-nitrile foam insulation is not. Still further, the LLDPE foam is tougher and has a higher puncture resistance than some conventional foams (e.g., more difficult to tear and puncture than some conventional foams and has higher elongation before breaking than some conventional foams).

BRIEF DESCRIPTION OF THE DRAWINGS

Non-limiting and non-exhaustive embodiments of the method and systems disclosed herein are described with reference to the following Figures, wherein like reference numerals refer to like parts throughout the various views unless otherwise specified.

DETAILED DESCRIPTION

Figure 1:
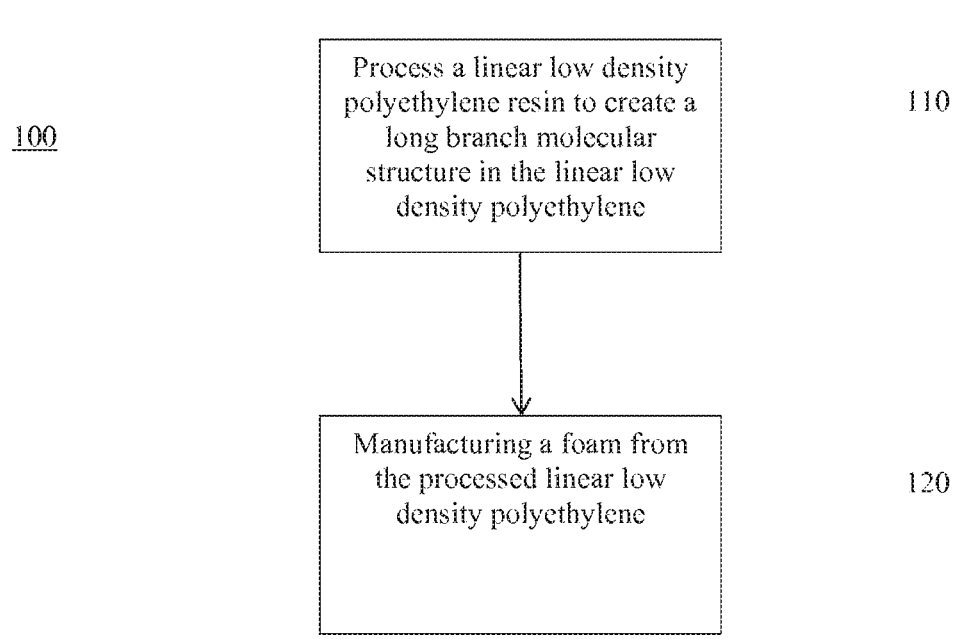
FIG. 1 is a flow chart illustrating a method for manufacturing high temperature polyethylene foam insulation according to various embodiments described herein.

In some embodiments, a high-temperature linear low density polyethylene foam is described. The linear low density polyethylene foam can have a maximum operating temperature of about 220° F. Further, the linear low density polyethylene foam can have a density in the range of from 0.6 to 10.0 lbs/ft³. In some embodiments, the linear low density polyethylene foam meets the ASTM C411 standard for hot-surface performance of high-temperature thermal insulation when tested at temperatures up to 220° F. In some embodiments, the linear low density polyethylene foam has a 25/50 flame/smoke rating when tested according to the ASTM E 84 standard test method for surface burning characteristics of building materials.

The LLDPE foam generally comprises a LLDPE resin that is processed prior to undergoing a foaming process to create a long branch molecular structure in the LLDPE resin. Generally speaking, unprocessed LLDPE resin has a linear structure with a number of short branches. Creating a long branch molecular structure in the LLDPE resin generally results in the LLDPE having improved melt strength. In some embodiments, the long branch molecular structure created in the LLPDE resin does not result in the LLDPE resin losing its thermoplastic properties. In some embodiments, the thermoplastic properties of the LLDPE are retained after creating a long branch molecular structure in the LLDPE resin by preventing crosslinking amongst the branches of the LLDPE. In some embodiments, the LLDPE resin processed to have a long branch molecular structure is free of crosslinking, and can be referred to as non-crosslinked LLDPE resin.

Any suitable LLDPE resin can be used as the basis for the LLDPE foam. In some embodiments, the linear low density polyethylene foam is prepared from a LLDPE resin having a high melt temperature. In some embodiments, the LLDPE resin is selected from those LLDPE resins having a melt temperature of around 255° F. In some embodiments, the LLDPE resin is selected from those LLDPE resins having a melt index in the range of from 15 to 25 at 190° C. Suitable LLDPE resins can be obtained from a variety of manufacturers, including, but not limited to, ExxonMobil Chemical Company of Houston, Tex. and Dow Chemical Company of Midland, Mich.

The LLDPE foam described herein can include other components in addition to the processed LLDPE resin. Any additional components typically used in the foam manufacturing process and/or present in foam insulation products can be included. Exemplary additional components include, but are not limited to, flame retardant, color pigments, nucleating agents, diffusion blockers, blowing agents, and any combinations thereof. Any other additives that improve any particular properties of the foam can also be included.

In some embodiments, the linear low density polyethylene foam can have a maximum operating temperature of about 220° F. Maximum operating temperature, as described by the present application, is the maximum temperature to which the material can be exposed for 96 hours or longer while exhibiting less than 5% linear shrinkage at the expiration of 96 hours. Maximum operating temperature is generally related to the ASTM C411 standard for hot-surface performance of high-temperature thermal insulation (discussed in greater detail below), which tests foam pipe insulation for warpage and other qualitative changes in the physical properties of the foam insulation. While the ASTM C411 standard is specific to foam pipe insulation, the maximum operating temperature described herein applies to the LLDPE foam regardless of the shape and specific application in which it is used.

In some embodiments, the LLDPE foam described herein exceeds the standards for maximum operating temperature and/or the ASTM C411 standard. In some embodiments, the LLDPE foam exhibits less than less than 3% linear shrinkage when subjected to a temperature of 220° F. for 96 hours or longer. In some embodiments, the LLDPE foam exhibits less than less than 0.7% linear shrinkage when subjected to a temperature of 220° F. for 96 hours or longer. In some embodiments, the LLDPE foam exhibits less than 5% linear shrinkage even when exposed to temperatures of up to 220° F. for longer than 96 hours, such as longer than 637 hours. Additionally, the LLDPE foam described herein may exhibit limited or no cracking, delamination, and/or warpage when exposed to temperatures of 220° F. for 96 hours or longer. In some embodiments, the LLDPE foam described here exhibits no cracking when exposed to a temperature of 220° F. for 96 hours.

The linear low density polyethylene foam having a maximum operating temperature of about 220° F. makes the low linear density polyethylene foam suitable for insulation applications requiring a higher operating temperature than provided by, e.g., LDPE insulation.

The LLDPE foam can have a density in the range of from 0.6 to 10.0 lbs/ft$^3$, such as in the range of from 1.0 to 4.0 lbs/ft$^3$. In some embodiments, the LLDPE foam described herein has an R value similar or identical to the R value exhibited by elastomeric PVC-nitrile foam insulation and/or LDPE foam insulation.

In some embodiments, the LLDPE foam described herein is fully recyclable. The LLDPE foam can be recycled by virtue of at least the LLDPE foam retaining thermoplastic properties, rather than being converted to a thermoset during the process of manufacturing a foam from the initial LLDPE resin. The LLDPE foam is considered fully recyclable because it can be melted into a melt material that may be reused in a variety of different ways. The ability to recycle the LLDPE foam is an advantage over other foam insulation materials that are not recyclable, such as elastomeric PVC-nitrile foam insulation.

In some embodiments, the LLDPE foam also exhibits improved toughness when compared to other foam insulation materials, such an elastomeric PVC-nitrile foam insulation. The LLDPE foam toughness is exhibited by, for example, higher elongation before breaking than exhibited by elastomeric PVC-nitrile foam insulation. The LLDPE foam toughness is also exhibited by higher tear strength than elastomeric PVC-nitrile foam insulation. The LLDPE foam also exhibits higher puncture resistance as compared to, e.g., elastomeric PVC-nitrile foam.

In some embodiments, the LLDPE foam described herein meets the ASTM C411 standard for hot-surface performance of high-temperature thermal foam pipe insulation when tested at 220° F. The ASTM C411 test calls for the LLDPE foam material to be applied to a surface heated at a specific temperature for a specific period of time and then checking the material for defects such as cracking, delamination, warpage, flaming, glowing, smoldering and/or smoking after the test is completed. In order to satisfy the ASTM C411 standard, the foam insulation must be found to exhibit little to no cracking, delamination, warpage, flaming, glowing, smoldering, and/or smoking over the testing period of at least 96 hours. The LLDPE foam described herein meets this criteria and additionally exhibits less than 5% linear shrinkage (related to ASTM C 534 standard) when tested by the ASTM C 411 procedure at a temperature of about 220° F.

In some embodiments, the LLDPE foam described herein has a 25/50 rating (flame spread/smoke development) when tested by the ASTM E84 standard test method for surface burning characteristics of building materials. The ASTM E84 test generally measures surface flame spread and smoke density of a material as compared against the surface burning characteristics of select grade red oak (a 100 rating) and fiber-cement board (a 0 rating) surfaces under specific fire exposure conditions.

With reference to FIG. 1, a method 100 for manufacturing a high temperature LLDPE foam includes a step 110 of processing the LLDPE resin to create a long branched molecular structure in the LLDPE, and a step 120 of manufacturing a foam using the processed LLDPE resin.

In step 110, an LLDPE resin is processed to create a long branched molecular structure in the LLDPE. Generally speaking, unprocessed LLDPE resin has a linear structure with a number of short branches. Processing the LLDPE resin to have a long branch molecular structure helps to improve the melt strength of the LLDPE resin. Thus, in some embodiments, the processing of step 110 can be considered as a processing step to improve the melt strength of the LLDPE resin.

The LLDPE resin used in the processing step 110 can be any LLDPE resin material having a suitable melt temperature. In some embodiments, the LLDPE resin is selected from those LLDPE resins having a melt temperature of about 255° F. In some embodiments, the LLDPE resin is selected from this LLDPE resins having a melt index in the range of from 15 to 25 at 190° C. The LLDPE resin is typically provided in a pellet form. LLDPE resin can be obtained from a variety of manufacturers, including, but not limited to, ExxonMobil Chemical Company of Houston, Tex. and Dow Chemical Company of Midland, Mich.

In step 110, the LLDPE resin is processed to create a long branch molecular structure in the LLDPE resin and/or improve the melt strength of the LLDPE resin. Any process of creating a long branch molecular structure in the LLDPE resin or improving the melt strength can be used, provided that the processing step also retains the thermoplastic property of the LLDPE resin. A processing step that creates a long branch molecular structure in the LLDPE resin and/or improves the melt strength of the LLDPE resin but also results in creating gels and crosslinking is not suitable for the processing step, as the processed LLDPE resin will not remain thermoplastic and, as such, cannot be pressed with conventional equipment used for foaming non-crosslinked LDPE.

In some embodiments, the processing step 110 is carried out on the LLDPE to decrease the melt index of the LLDPE resin. In some embodiments, processing step 110 is carried out on an LLDPE resin having a melt index in the range of from 15 to 25 at 190° C. and is carried out until the melt index of the LLDPE resin is reduced to in the range of 0.7 to 5.0 at 190° C.

In some embodiments, the processing of the LLDPE resin is carried out using an irradiation process. The irradiation process can be carried out using electron beam technology, which generally does not require additives and avoids the generation of hazardous by-products. Electron beam irradiation also typically requires minimal exposure time and is energy efficient. Electron beam irradiation can also be carried out so as to avoid chemical cross-linking.

Figure 2:
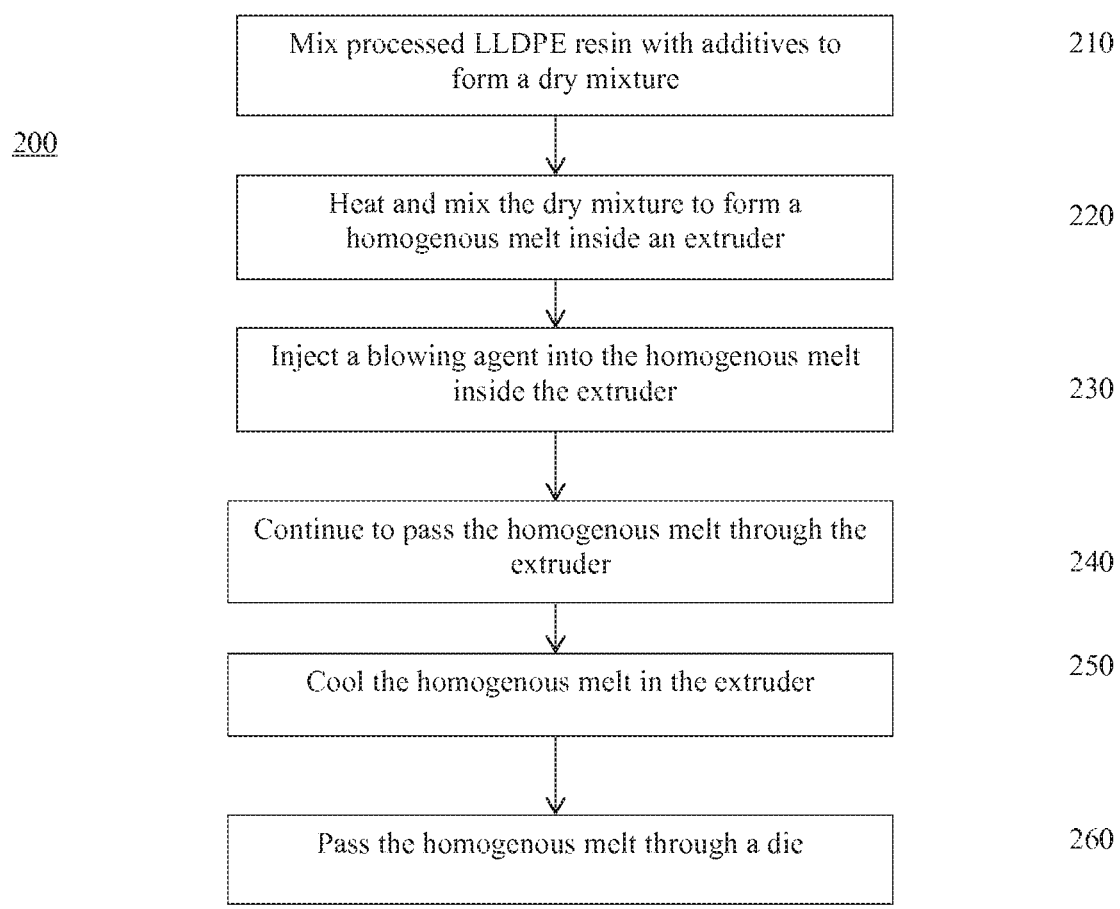
FIG. 2 is a flow chart illustrating a method for manufacturing high temperature polyethylene foam insulation according to various embodiments described herein.

In step 120, the processed LLDPE resin having a long branch molecular structure is used in a foam manufacturing process. Any foam manufacturing process and equipment suitable for use in manufacturing non-crosslinked LDPE can be used. With reference to FIG. 2, a foam manufacturing process 200 can include a step 210 of mixing the processed LLDPE resin with additives to form a dry mixture, a step 220 of heating and mixing the dry mixture in an extruder to form a homogenous melt, a step 230 of injecting a blowing agent into the homogenous melt, a step 240 of continuing to pass the homogenous melt through the extruder, a step 250 of cooling the homogenous melt, and a step 260 of passing the homogenous melt through a die.

In step 210, the processed LLDPE resin is mixed with additives. The mixing of materials can be accomplished by, for example, introducing the processed LLDPE resin and the additives into the feed zone of an extruder. Generally speaking, the processed LLDPE resin and the additives are both in a pellet form when mixed together.

Any additives known to those of ordinary skill in the art for being useful in the production of foam can be used. In some embodiments, the additives added to and mixed with the processed LLDPE resin are a nucleating agent and a diffusion blocker. The nucleating agent can be used to initiate the formation of bubbles in the foam and control cell size in the foam product. The diffusion blocker can be used to prevent cells in the foam product from collapsing. Any suitable nucleating agents and diffusion blockers can be used in step 210. Other additives known to be useful in the manufacture of foam material can be used step in 210, and the additives can be used in any combination.

In step 220, the dry mixture of processed LLDPE resin and additives are heated and mixed inside of an extruder until a homogenous melt is formed. The heating and mixing are carried out using components of the extruder. The extruder used in the process described herein can be any type of extruder suitable for use in manufacturing polymeric foams. The extruder can be a single screw extruder, a tandem extruder, or a twin screw extruder, among others.

As discussed in greater detail above, the melt produced in step 220 has improved melt strength by virtue of the LLDPE resin having been processed to provide a long branched molecular structure.

In step 230, a blowing agent is injected into the homogenous melt. The injection of the blowing agent occurs inside of the extruder. The blowing agent can be injected into the homogenous melt using a high pressure metering system which is capable of overcoming the pressure of the homogenous melt inside the extruder. Any suitable blowing agent known to those of ordinary skill in the art for use in manufacturing foam materials can be used. In some embodiments, the blowing agent is isobutene, n-butane, isopentane, pentane, carbon dioxide, nitrogen, HFC, HFO, sulfur hexafluoride or any combination thereof.

After injection of the blowing agent, the homogenous melt continues to pass through the extruder in step 240. During this time, the temperature of the homogenous melt is increased. The temperature is generally increased due to the combined shear and compressive forces applied to the homogenous melt by the rotating extruder screws.

In step 250, the homogenous melt is cooled prior to being foamed. The homogenous melt can be cooled by passing the homogenous melt through a cooling zone. In some embodiments, the cooling zone is a part of the same extruder used to carry out steps 210, 220, and 230. In other embodiments, the cooling zone is in a second extruder (such as when a tandem extruder is used). Heat exchangers can also be used to cool the homogenous melt. In addition to cooling the homogenous melt, it is also important to create a uniform temperature profile in the homogenous melt as it leaves the cooling zone. A uniform temperature profile can help to ensure uniform cell structure in the foam product.

In step 260, the cooled homogenous melt is passed through a die to form the desired geometry for the foam material. The die can have any geometry desired for the manufactured foam product. When the homogenous melt passes from the high pressure zone of the die to atmospheric pressure, the blowing agent in the homogenous melt goes through a change of phase (liquid to gas) and permits expansion of bubbles to form a foam having a density in the range of from 0.6 to 10.0 lbs/ft$^3$.

Additional steps that can be carried out after step 260 include, but are not limited to, using a conveyor belt to carry the foam product away from the extruder, external cooling of the foam to maintain shape, using a puller for feeding the foam to a cutter, and using a cutter for cutting the foam at the desired length.

The above method is not limited to the use of extrusion processing to foam the processed LLDPE resin. Other methods known to those of ordinary skill in the art can also be used.

Testing

Rigorous testing was carried out on samples of high temperature LLDPE foam insulation manufactured using methods described herein.

In one experiment, a pipe at 220° F. was insulated with 3 samples of the high temperature LLDPE foam insulation described herein. Hot oil at 220° F. was run through the pipe for 683 hours, and the LLPE foam insulation was then checked for cracking, delamination and warpage. No delamination, cracking, or warpage were found. Additionally, no visible evidence of flaming, glowing, smoldering, or smoking were found. The average linear shrinkage was measured at 0.71%. The results of this experiment are summarized in Table 1 below.

TABLE 1

|  | Initial Length (in) | Ending Length (in) | Loss of Length (%) |
|---|---|---|---|
| Sample 1 | 11.75 | 11.75 | 0.00 |
| Sample 2 | 12 | 11.81 | 1.56 |
| Sample 3 | 12 | 11.9325 | 0.56 |
| Avg loss of length |  |  | 0.71 |

Testing started at 220° F.;
Testing run for 683 hours

Tables 2 and 3 below summarize physical testing carried out on a sample of the LLDPE foam described herein and LDPE foam insulation.

TABLE 2

|  | Tensile Strength (lbs/in²) Average | Elongation % Average |
|---|---|---|
| LDPE Foam Insulation | 50.5 | 63 |
| LLDPE Foam Insulation | 31.6 | 150 |

TABLE 3

|  | 5% compression on a 2 × 2 specimen | 25% compression on a 2 × 2 specimen | 65% compression on a 2 × 2 specimen |
|---|---|---|---|
| LDPE Foam Insulation 1 | 8.18 | 22.66 | 83.36 |
| LDPE Foam Insulation 2 | 7.77 | 31.85 | 81.74 |
| LDPE Foam Insulation 3 | 5.58 | 20.1 | 80.22 |
| Average (in Lbs) | 7.18 | 24.87 | 81.77 |
| Average (in Lbs/in²) | 1.80 | 6.23 | 20.45 |
| LLDPE Foam Insulation 1 | 7.9 | 17.06 | 66.44 |
| LLDPE Foam Insulation 1 | 7.47 | 16.32 | 64.48 |
| LLDPE Foam Insulation 1 | 7.93 | 17.43 | 68.29 |
| Average (in Lbs) | 7.77 | 16.94 | 66.40 |
| Average (in Lbs/in²) | 1.95 | 4.24 | 16.6 |

Table 4 provides a general comparison of LLDPE foam insulation as described herein versus elastomeric PVC-nitrile foam insulation.

TABLE 4

|  | Elastomeric PVC-Nitrile foam insulation | LLDPE Foam Insulation |
|---|---|---|
| Density | 4 to 7 lbs/ft³ | 1.2 to 2.0 lbs/ft³ |
| Compression Deflection 25% | 2 to 5 psi | 3.5 to 5.0 psi |
| Tensile | 30 psi min | 30 psi |
| Elongation | 75% min | 150% |
| Temperature use Low (D1056) | −40° F. | −120° F. |
| Temperature use High (D1056) | +220° F. | +220° F. |

From the foregoing, it will be appreciated that specific embodiments of the invention have been described herein for purposes of illustration, but that various modifications may be made without deviating from the scope of the invention. Accordingly, the invention is not limited except as by the appended claims.

I claim:
1. A method of insulating a pipe with foam insulation, comprising:
obtaining a resin consisting essentially of a non-crosslinked linear low density polyethylene resin having an initial melt index between 15 and 20 at 190° C.;
causing the linear low density polyethylene resin to be irradiated to form an irradiated, non-crosslinked linear low density polyethylene resin having a final melt index between 0.7 and 5.0 at 190° C. and having the long chain branch structure;
adding one or more additives selected from the group consisting of flame retardants, color pigments, nucleating agents, diffusion blockers, and blowing agents to the irradiated, non-crosslinked linear low density polyethylene resin;
foaming the irradiated, non-crosslinked linear low density polyethylene resin with the one or more additives to obtain a foam, wherein the foam forms a foam pipe insulation material to be applied to a surface of a pipe such that the foam pipe insulation material meets the ASTM C411 standard for hot-surface performance of high-temperature thermal insulation when tested at 220° F.;
applying to the surface of the pipe the foam pipe insulation material; and
wherein the pipe is configured for passing media through the portion of the pipe on which the foam pipe insulation material is applied.
2. The method of claim 1, wherein the foam pipe insulation material does not exhibit any cracking, delamination or warpage after 96 hours.
3. The method of claim 1, wherein the foam pipe insulation material does not exhibit any cracking, delamination or warpage after 683 hours.
4. The method of claim 1, wherein the foam has a density in the range of from 0.6 to 10.0 lbs/ft3.
5. The method of claim 4, wherein the foam has a density in the range of from 1.0 to 2.0 lbs/ft3.
6. The method of claim 1, wherein the irradiation is carried out without eliminating the thermoplastic property of the linear low-density polyethylene resin.
7. A method of insulating a pipe with foam insulation comprising:
manufacturing a foam insulation, comprising:
irradiating a resin wherein the resin consists essentially of a non-crosslinked linear low-density polyethylene resin having an initial melt index in the range of from 15 to 20 at 190° C. until the melt index is reduced to in the range of from 0.7 to 5.0 at 190° C. and having a long chain branch structure;

mixing the irradiated liner low-density polyethylene resin with one or more foam additives;

heating the mixture of the irradiated liner low-density polyethylene resin and the one or more foam additives to thereby form a melt;

injecting a blowing agent into the melt;

cooling the melt; and passing the cooled melt through a die to thereby form a foam insulation such that the foam insulation meets the ASTM C411 standard for hot-surface performance of high-temperature thermal insulation when tested at 220° F.;

applying to a surface of a pipe the foam insulation; and passing media through the portion of the pipe on which the foam insulation is applied.

* * * * *